US007064336B2

(12) United States Patent
Archer et al.

(10) Patent No.: US 7,064,336 B2
(45) Date of Patent: Jun. 20, 2006

(54) ADAPTABLE RADIATION MONITORING SYSTEM AND METHOD

(75) Inventors: Daniel E. Archer, Livermore, CA (US); Brock R. Beauchamp, San Ramon, CA (US); G. Joseph Mauger, Livermore, CA (US); Karl E. Nelson, Livermore, CA (US); Michael B. Mercer, Manteca, CA (US); David C. Pletcher, Sacramento, CA (US); Vincent J. Riot, Berkeley, CA (US); James L. Schek, Tracy, CA (US); David A. Knapp, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/874,127

(22) Filed: Jun. 21, 2004

(65) Prior Publication Data

US 2005/0023477 A1    Feb. 3, 2005

Related U.S. Application Data

(60) Provisional application No. 60/480,366, filed on Jun. 20, 2003, provisional application No. 60/516,130, filed on Oct. 31, 2003.

(51) Int. Cl.
*G01T 1/24* (2006.01)
*G01J 1/00* (2006.01)

(52) U.S. Cl. .............. 250/370.1; 250/370.09; 378/1; 378/11; 378/39; 378/55; 702/23; 702/26; 702/28; 702/32; 702/40; 702/49

(58) Field of Classification Search ..............
250/370.11–370.14, 370.01, 370.09, 370.1, 250/363.01–363.02, 369, 336.1; 378/1, 5, 378/8–11, 49, 57, 62–65, 169; 702/23, 26, 702/28, 32, 40, 49
See application file for complete search history.

(56) References Cited

U.S. PATENT DOCUMENTS 4,061,919 A * 12/1977 Miller et al. ........... 250/363.02

(Continued)

FOREIGN PATENT DOCUMENTS

GB    PCT/GB98/00951    * 3/1998

OTHER PUBLICATIONS

AmpTek (a) "Products" (Oct. 17, 2000) <http://www.amptek.com/products.html>.*

(Continued)

*Primary Examiner*—Nikita Wells
*Assistant Examiner*—Bernard E. Souw
(74) *Attorney, Agent, or Firm*—James Tak; Alan H. Thompson (57) ABSTRACT

A portable radioactive-material detection system capable of detecting radioactive sources moving at high speeds. The system has at least one radiation detector capable of detecting gamma-radiation and coupled to an MCA capable of collecting spectral data in very small time bins of less than about 150 msec. A computer processor is connected to the MCA for determining from the spectral data if a triggering event has occurred. Spectral data is stored on a data storage device, and a power source supplies power to the detection system. Various configurations of the detection system may be adaptably arranged for various radiation detection scenarios. In a preferred embodiment, the computer processor operates as a server which receives spectral data from other networked detection systems, and communicates the collected data to a central data reporting system.

30 Claims, 7 Drawing Sheets

U.S. PATENT DOCUMENTS

| | | | |
|---|---|---|---|
| 4,217,496 A * | 8/1980 | Daniels et al. | 250/369 |
| 4,217,497 A * | 8/1980 | Daniels et al. | 250/369 |
| 4,550,381 A * | 10/1985 | Waechter et al. | 250/369 |
| 5,120,968 A * | 6/1992 | Fiorito et al. | 250/397 |
| 5,307,299 A * | 4/1994 | Stein et al. | 708/420 |
| 5,532,944 A | 7/1996 | Battista | |
| 5,722,405 A | 3/1998 | Goldberg | |
| 5,777,333 A | 7/1998 | Martini et al. | |
| 6,184,531 B1 * | 2/2001 | Smart et al. | 250/370.01 |
| 6,256,373 B1 * | 7/2001 | Bernstein et al. | 378/45 |
| 6,269,144 B1 * | 7/2001 | Dube et al. | 378/71 |
| 6,275,563 B1 * | 8/2001 | Griffin, Jr. | 378/58 |
| 6,342,701 B1 | 1/2002 | Kash | |
| 6,541,763 B1 | 4/2003 | Lingren et al. | |
| 6,552,348 B1 | 4/2003 | Cherry et al. | |
| 6,573,762 B1 | 6/2003 | Wessendorf et al. | |
| 6,628,984 B1 | 9/2003 | Weinberg | |
| 6,781,134 B1 * | 8/2004 | Murray et al. | 250/370.13 |
| 2003/0152186 A1 * | 8/2003 | Jurczyk et al. | 376/109 |
| 2003/0161526 A1 * | 8/2003 | Jupiter et al. | 382/154 |
| 2004/0178339 A1 * | 9/2004 | Gentile et al. | 250/282 |
| 2004/0195517 A1 * | 10/2004 | Rowland et al. | 250/370.15 |
| 2004/0217296 A1 * | 11/2004 | Rowland et al. | 250/370.15 |
| 2005/0023477 A1 * | 2/2005 | Archer et al. | 250/370.11 |
| 2005/0094466 A1 * | 5/2005 | Archer et al. | 365/222 |

OTHER PUBLICATIONS

AmpTek (b) "Gamma-8000" (Oct. 21, 2002) <http://web.archive.org/web/*/http://http://www.amptek.com/gamma8k.html>.*

DOE/Y-12, (Aug. 21, 2001) <http://web.archive.org/web/*/http://www.y12.doe.gov/rco/inv.htm>.*

NTTC, "Emergency Response Technology program" (1999) <http://64.333.161.104/search?q=cache:gyrkQ_Gezc4J:www.nttc.edu/ertProgram/technologies/technology.asp?technology_id=407>.*

TGI/RCI-Rutgers (May 19, 2001) <http://web.archive.org/web/*/http://www.rci.rutgers.edu/~apoulev.*

Canberra (a) "Multichannel Analyzers" (Feb. 20, 2003) <http://web.archive.org/web/*/http://www.canberra.com/products/476.asp>.*

Canberra (b) "Na InsPector Portable Spectroscopy Workstation" <http://ww2.canberra.com/pcatalog.nsf/PCL/40935EBB7B185C3785256873006EF6CD?OpenDocument&area=product&cat=Multichannel+Analyzers+–+Portable>.*

Canberra (c) "InsPector 2000 DSP Portable Spectroscopy Workstation" <http://ww2.canberra.com/pcatalog.nsf/PCL/05CC7F6708BB82AC8525699F006946.D2?OpenDocument&area=product&cat=Multichannel+Analyzers+–+Portable>.*

ORTEC "DSP-Scint" (1996, see attached ORTEC's Affidavit).*

Target Instruments (see J. Stein's Affidavit).*

* cited by examiner

ADAPTABLE RADIATION MONITORING SYSTEM AND METHOD

I. CLAIMS OF PRIORITY IN PROVISIONAL APPLICATIONS

This application claims the benefit of U.S. provisional application No. 60/480,366 filed Jun. 20, 2003, and U.S. provisional application No. 60/516,130 filed Oct. 31, 2003.

The United States Government has rights in this invention pursuant to Contract No. W-7405-ENG-48 between the United States Department of Energy and the University of California for the operation of Lawrence Livermore National Laboratory.

II. FIELD OF THE INVENTION

The present invention relates to radiation detection systems. More particularly the present invention relates to an adaptable and portable radiation detection system capable of collecting gamma radiation spectral data in very small time bins, such as less than about 150 msec or operating in list-mode, to detect radiation sources at road speeds typically having less than 1 second data acquisition windows, and analyzing the spectral data to determine source identification.

III. BACKGROUND OF THE INVENTION

There is a growing national need for a system capable of detecting small amounts of radioactive material, such as special nuclear material (SNM) and shielded highly enriched uranium (HEU), especially in high traffic environments (vehicular, cargo, and human) such as portals, streets and highways, etc. Moreover, and upon detection, there is a need to identify the unknown radioactive material by its spectral signature. Various types of radiation detectors in various packages have been and are currently utilized, such as NaI, He-3, and scintillation-based field detectors, as well as cryogenically-cooled high purity germanium (HPGe) and silicon detectors. Cryogenically cooled detectors are known to require large batteries, external power, or cryogens to maintain operating temperature, and have therefore been difficult to use in the field that provides, for example, in situ diagnostics. Due to these and other problems, non-HPGe or otherwise room-temperature detectors are often used for field applications.

The low spectral resolution and performance of such non-HPGe detectors, however, have been known to make radiation source identification difficult. Additionally, many commercially available analog radiation detectors are typically configured to record spectral quality sensor data in time bins of no less than 1 second. This is often inadequate, especially for detection scenarios where a moving source is involved, and the window of detection opportunity for collecting the majority data is often a fraction of a second. For example, in a situation where a moving source passes by a detector at 65 mph with a closest approach to the detector of three meters, eighty percent of the radiation collected from the pass by will be collected in less than 0.5 seconds. For these situations involving moving radioactive sources, the use of commercially available radiation detectors with one second time binning will average out and thereby lose many features in the spectral data.

Additionally, monitoring an area for radiation often involves customizing the placement, orientation and other setup to optimize radiation detection, especially for high speed source applications known to move along a known path and/or direction. While many conventional radiation detectors record spectral data from a given localized area, there is no additional information associated with it, such as for example, the directionality of a moving source.

There is therefore a need for a radiation detections system utilizing a standard, non-HPGe detector, capable of collecting spectral data in very small time bins, e.g. less than about 150 msec, including list-mode operation of single photon detection. Such very small time bins would enable fluctuations of signal coming from the detector to be more easily scrutinized. Additionally, there is a need for such a radiation detection system to be configurable to adapt to various radiation detection scenarios, such as for example, monitoring packages, pedestrian, or high-speed vehicular traffic.

IV. SUMMARY OF THE INVENTION

One aspect of the present invention includes a portable radioactive-material detection system comprising: at least one non-HPGe radiation detector capable of detecting gamma-radiation and coupled to a multi-channel analyzer capable of collecting spectral data in small time bins of less than about 150 msec, whereby radioactive sources moving at high speeds may be detected; a computer processor operably connected to the multi-channel analyzer and having a first processing module for determining triggering events from the spectral data; data storage means operably connected to the computer processor for storing said spectral data; and a power source supplying power to the detection system.

Another aspect of the present invention includes a method of monitoring an area for radioactive materials comprising the steps of: using a portable radiation detector coupled to a multi-channel analyzer to collect spectral data in very small time bins of less than about 150 msec to enable detection of radioactive sources moving at high speeds; analyzing the spectral data to determine triggering events from the spectral data; and upon a determination of a triggering event, transmitting the spectral data associated with the triggering event to a central data reporting system.

Another aspect of the present invention includes a method in a computer system for monitoring an area for radioactive sources, said method comprising the computer-implemented steps of: controlling a multi-channel analyzer coupled to a radiation detector to collect spectral data in very small time bins of less than about 150 msec. for detecting radioactive sources moving at high speeds with detection windows of less than about 1 second; controlling a first computer processor module to determine the occurrence of triggering events from the spectral data; controlling a data storage device operably connected to the first computer processor to store the spectral data and any triggering events for post-collection analysis.

And another aspect of the present invention includes an article of manufacture comprising: a computer usable medium having computer-readable program code means embodied therein for causing a gamma-radiation detection system to monitor for gamma-radiation sources moving at high speeds, the computer-readable program code means in said article of manufacture comprising: computer-readable program code means for causing the control of a multi-channel analyzer coupled to a radiation detector to collect spectral data in very small time bins of less than about 150 msec. for detecting radioactive sources moving at high speeds; computer-readable program code means for causing the control of a first computer processor module to determine the occurrence of triggering events from the spectral data; and computer-readable program code means for causing the control of a data storage device operably connected to the first computer processor to store the spectral data and triggering events for post-collection analysis.

V. BRIEF DESCRIPTION OF THE DRAWINGS

The accompanying drawings, which are incorporated into and form a part of the disclosure, are as follows.

VI. DETAILED DESCRIPTION

The present invention is directed to an adaptable, portable, and self-contained radiation detector and monitoring system used to detect and identify moving radioactive sources of radionuclides in portals or in high speed environments such as on roads and highways. The unit includes a rapid data collection system, and has an adaptability/flexibility to configure components based upon the detection need. For example, the detection system is adaptable for use over water or land, configurable with one or more detectors in a multi-node arrangement, and/or may be utilized as a standalone unit or networked with other detection systems. The radiation detection system is capable of being configured to run attended or unattended, and may optionally include a user interface allowing control and monitoring of data in real time. As such the detection system may be used for various monitoring applications including pedestrian portal monitoring, vehicle portal monitoring, package/luggage monitoring, conveyor monitoring, moving traffic monitoring, fixed or mobile monitor, detection/interdiction/identification unit for first responders.

Additionally, the radiation detection system uses one or more standard, non-HPGE detectors, such as NaI, He-3, and other scintillator detectors, to achieve very high counting sensitivity and a high signal to noise ratio. This is achieved using digital data collection electronics, such as a multi-channel analyzer (MCA) which is configured to collect spectral data in small time slices or bins of about 150 msec or less, which includes list-mode operation i.e. detecting individual photons. The collection of data in small time bins provides a great advantage when using them to look for moving radioactive sources, as discussed in the Background. By analyzing each small time bin, fluctuations of signal coming from the detector can be more easily scrutinized to determine whether or not they are simply statistical fluctuations in the background or actual changes in the background due to a real radioactive source. This can be achieved first of all by analyzing the raw count data, and secondly, by analyzing fluctuations in the spectral data.

Figure 1:
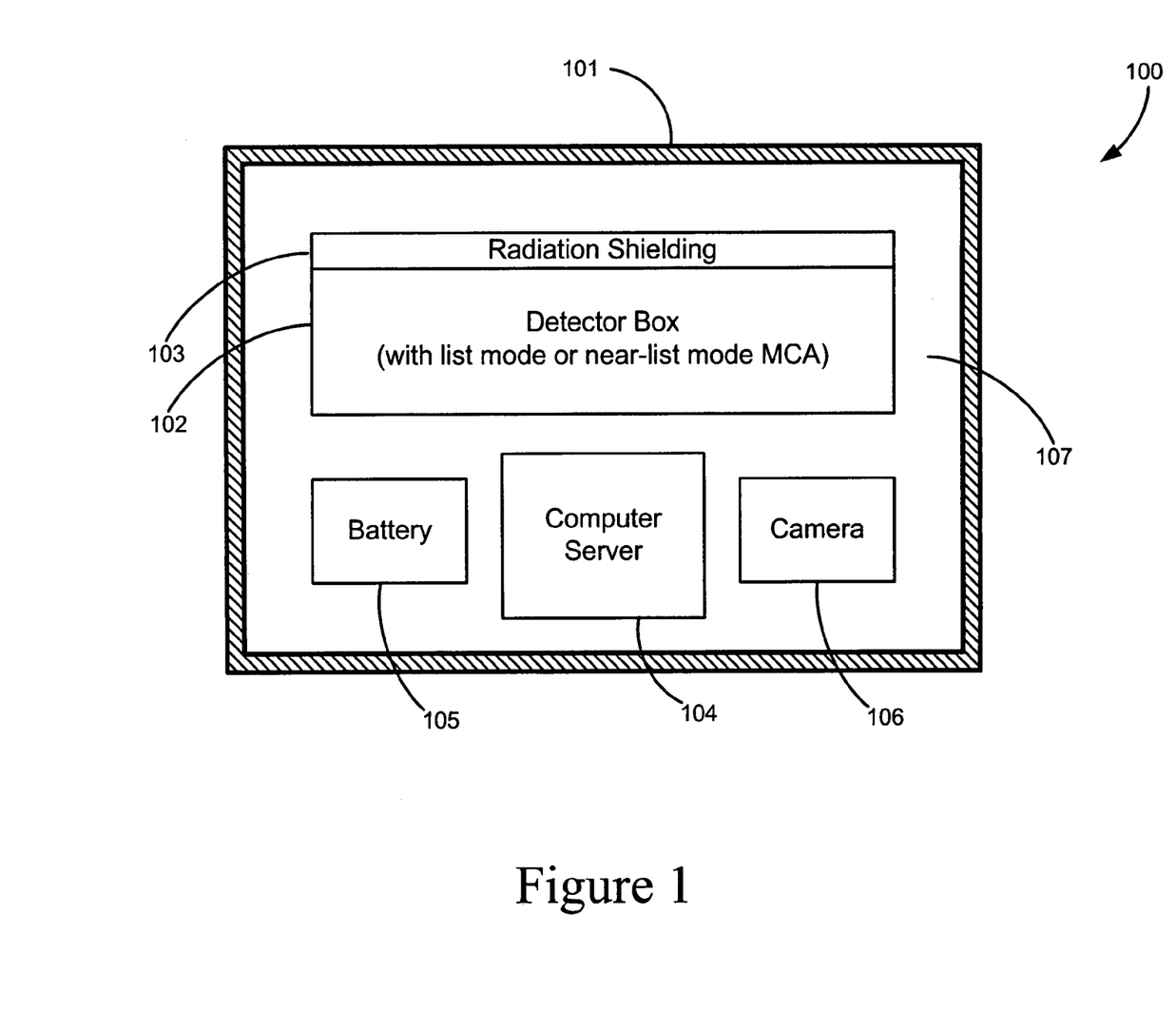
FIG. 1 is a schematic diagram of a first exemplary embodiment of the radiation detection system having a single unit configuration.

FIG. 1 shows the basic components in a first exemplary embodiment of the radiation detection system of the present invention, generally indicated at reference character 100, and including an internal computer server 104, a radiation detector 102 shown with radiation shielding 103, and a battery 105 or other power source supplying power to the system, such as 120 VAC or 12 VDC. A camera 106 or other recordable media device may also be optionally provided as an onboard or auxiliary device to visually record a triggering event detected by the system, e.g. shuttering the camera upon alarm. In FIG. 1, the detection system is shown as a single unit apparatus where the system components are mounted together in a system housing which is preferably a rugged, weather/waterproof, enclosed case 101. Packing foam 107 is shown provided for lining the enclosed case to provide mechanical/thermal insulation, and may include cutouts (not shown) to receive the various components.

The radiation detector 102 is preferably one or more NaI detectors, such as a large 4×4×16 inch or 2×4×16 inch NaI ($T_1$) crystal (with, for example, <8.0% FWHM at $^{137}$Cs 662 keV peak), and shielded on zero to four sides with radiation shielding, indicated at 103. The radiation shield is preferably made of tungsten (about ¼ to ½ inch thick) to provide background suppression, and have multiple sections which are variously configurable around the detector so as to detect radiation from a desired direction(s). Though not shown in the figures, the radiation detector 102 is coupled to a list-mode MCA or other MCA capable of collecting spectral data in small time slices of less than about 150 msec. Time slices of less than about 150 msec is defined to include list-mode operation where individual photon events are recorded. And the MCA is operably connected to the computer server 104 to provide detection data to the computer server for processing and analysis including, for example, source identification.

The internal computer server 104 serves as the main component and platform for controlling detector system functions and operation including, for example, receiving spectral data from the detector 102 to determine triggering events, analyzing the data for source identification, communicating/interfacing with auxiliary components, and communication data to other detection systems, including a remote data reporting system. The computer server 104 includes a computer processor, i.e. CPU (not shown), a data storage unit (not shown) such as a hard drive for storing data, and a suitable operating system preferably having networking capability, such as the Windows XP operating system commercially available from the Microsoft Corporation. And the data storage unit preferably has a storage capacity capable of storing several weeks of continuous data (e.g. 20 GB or more storage capacity). In any case, it is appreciated various types of off-the-shelf computer processors and components having different performance levels may be utilized for use in the computer server 104 to achieve a suitable level of data processing performance.

Figure 2:
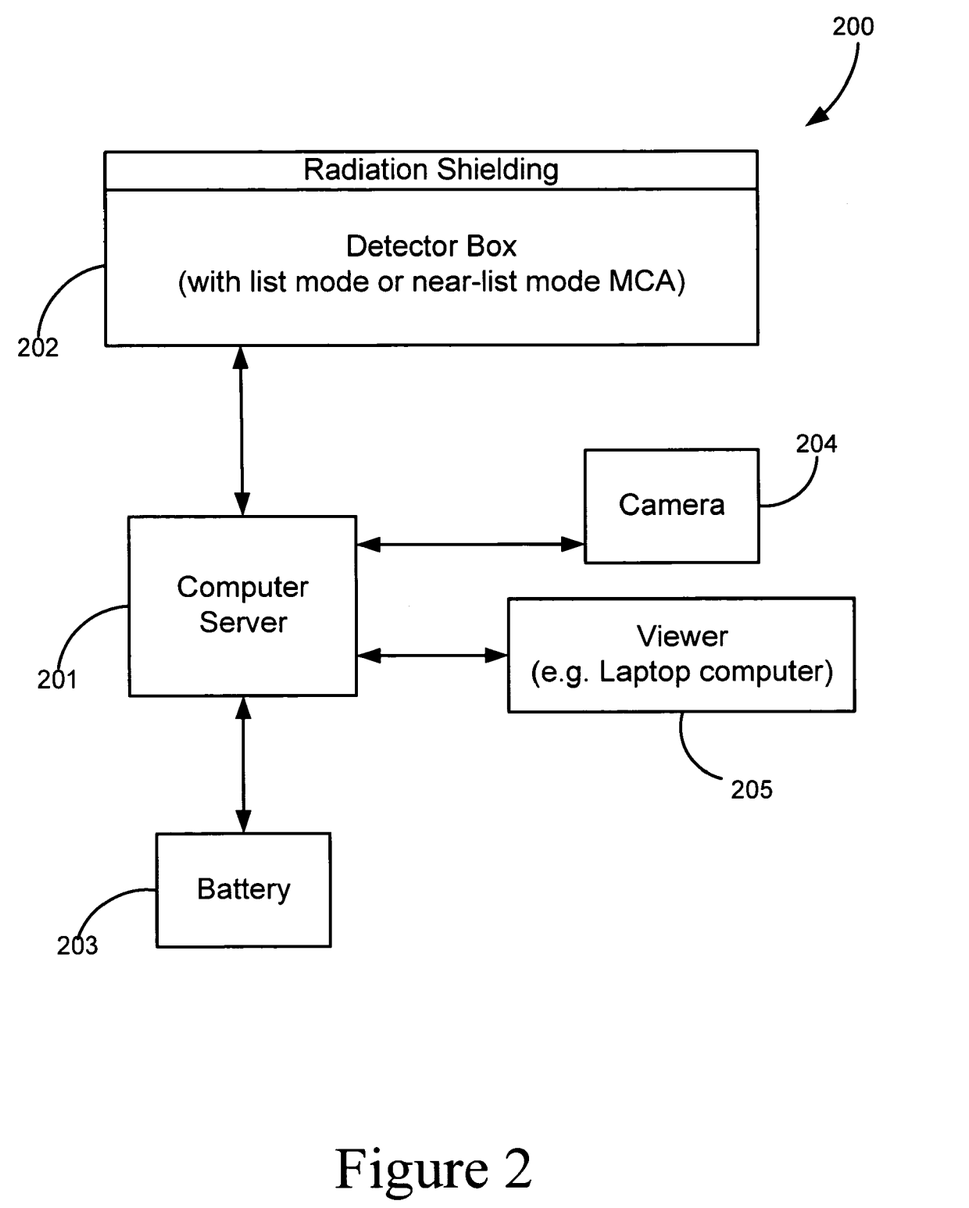
FIG. 2 is a schematic diagram of a second exemplary embodiment of the radiation detection system having a modular configuration comprising independent components.

The adaptability of the radiation detection system of the present invention is illustrated in FIG. 2 as a second exemplary embodiment 200 with modular components which are separately housed and independently positionable. Here the computer server 201 is shown separate from the detector box 202, the battery 203, the camera 204, and a viewer 205 e.g. a laptop computer for data visualization to a user, while still operably connected to the components as indicated by the arrows which represent wire or wireless communication. The components, as independent modules, enable and facilitate customized setup of the detection system at various detection venues. For example, the radiation detector 202 may be positioned at a strategic location in close proximity to known/unknown radiation sources for greatest detection sensitivity, while keeping the computer server 201 at a more user-accessible location. Additionally, breaking the system up into basic components allows the detector size and readout method of the configuration to be easily changed. For example, the system may be mounted to a law enforcement vehicle for detection while the vehicle is moving and stationary. In this configuration, the detector element can be much smaller than the previously mentioned large 2×4×16 inch or 4×4×16 inch crystals.

Figure 3:
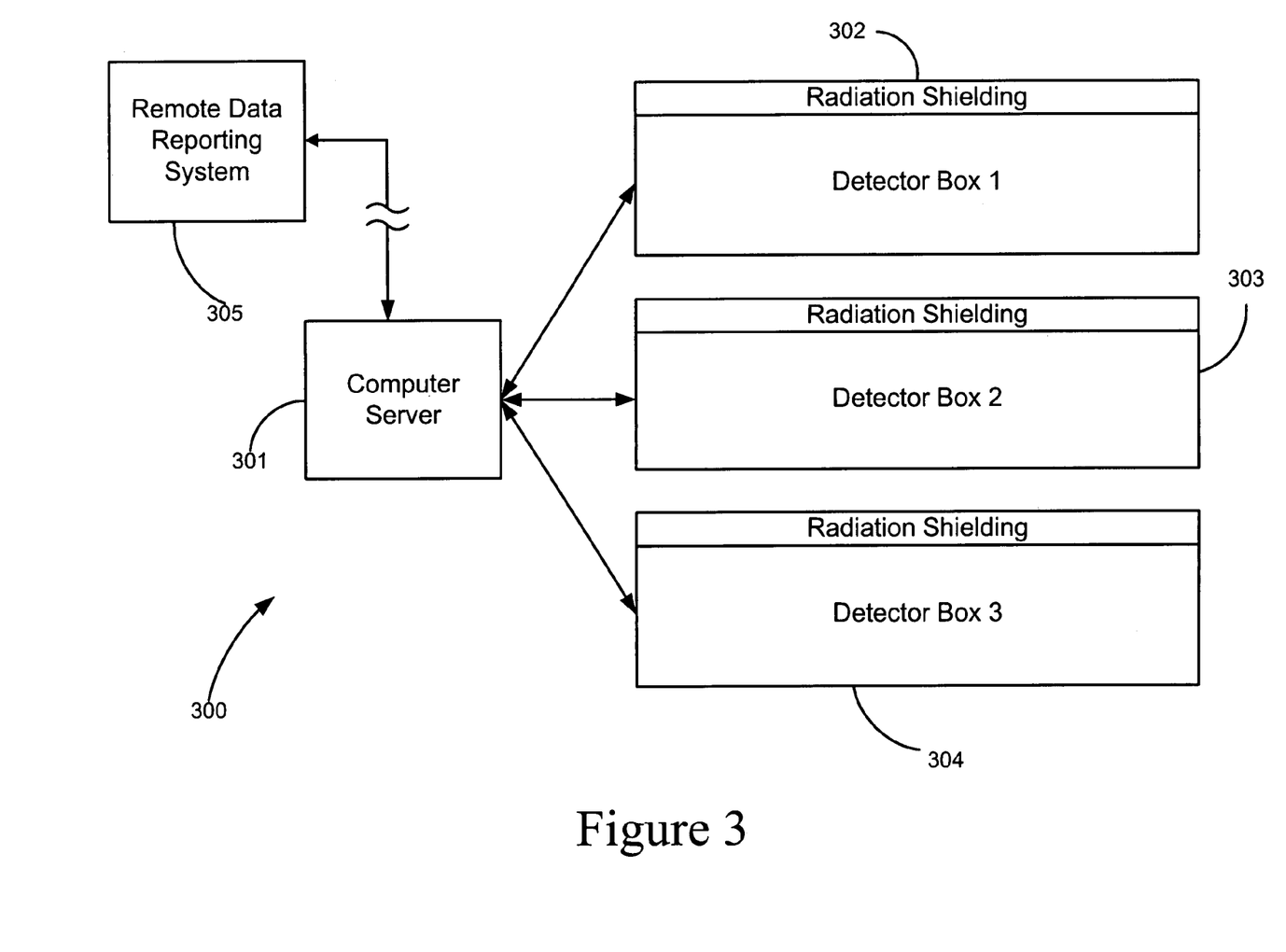
FIG. 3 is a schematic diagram of a third exemplary embodiment of the radiation detection having multiple detector nodes providing spectral data which is communicated to a remote data reporting system.

In FIG. 3 a third exemplary embodiment of the detection system is shown at 300, where the computer server 301 is used as a server hub (e.g. USB hub) to which independent radiation detectors (302–304) connect for reporting and recording spectral data. The server hub 301 may be particularly configured to communicate/interface with equipment from other commercial vendors. The advantage of such a centralized arrangement can be appreciated in the case of a portal monitor from a different manufacturer which is required to communicate with a remote central data archiving/reporting system 305, but lacks the communications capability of its own. The computer server 301 would be configured with an interface to receive, parse, and reformat the signals from the other detector system, and then report these to a central location over some form of ethernet (wired or wireless), so as to provide a server hub that can easily accept signals from most/all detector systems already installed at various locations. Moreover, the server hub would thus allow each portal monitor to report information to a central place, and basically function as a universal translator/communicator.

The present invention is also directed to the operational method of the radiation monitoring performed by the radiation detection system, including the process of using small time bin data to determine triggering events, especially for a moving radioactive source, the selection of data for post analysis such as for identification analysis, and the ID analysis itself. A trigger event is the presence of source radiation over the background radiation. Operation of the method is preferably provided, for example, by software in an embedded system configured to interface with and control various radiation detectors, such as for example, NaI crystals and $He_3$ tubes as well as multimedia devices such as cameras, etc. Features of the software may include: advanced triggering system on events for a large range of detectors, synchronized picture recording, automatic detector calibration, automatic isotope identification using commercially available ID software, and full network remote control operation through TCP/IP, etc. The software may possess a client module, i.e. the viewer, which is preferably installed on an auxiliary computer for real time viewing and remote control.

Generally, the operational software serves to control the monitoring process of the present invention in real time and is designed to be adaptable to the situation and can be used as part of a network or as a standalone system. The method includes the computer-implemented step of controlling a multi-channel analyzer coupled to a radiation detector to collect spectral data in very small time bins of less than about 150 msec for detecting radioactive sources moving at high speeds with detection windows of less than about 1 second. And preferably, ten or more channels of spectral data are collected by the MCA, such as thirty channels or even a thousand channels. A first computer processor module of the computer server operates to determine the occurrence of triggering events from the spectral data. And a data storage device operably connected to the first computer processor is controlled to store the spectral data and any triggering events for post-collection analysis.

Figure 4:
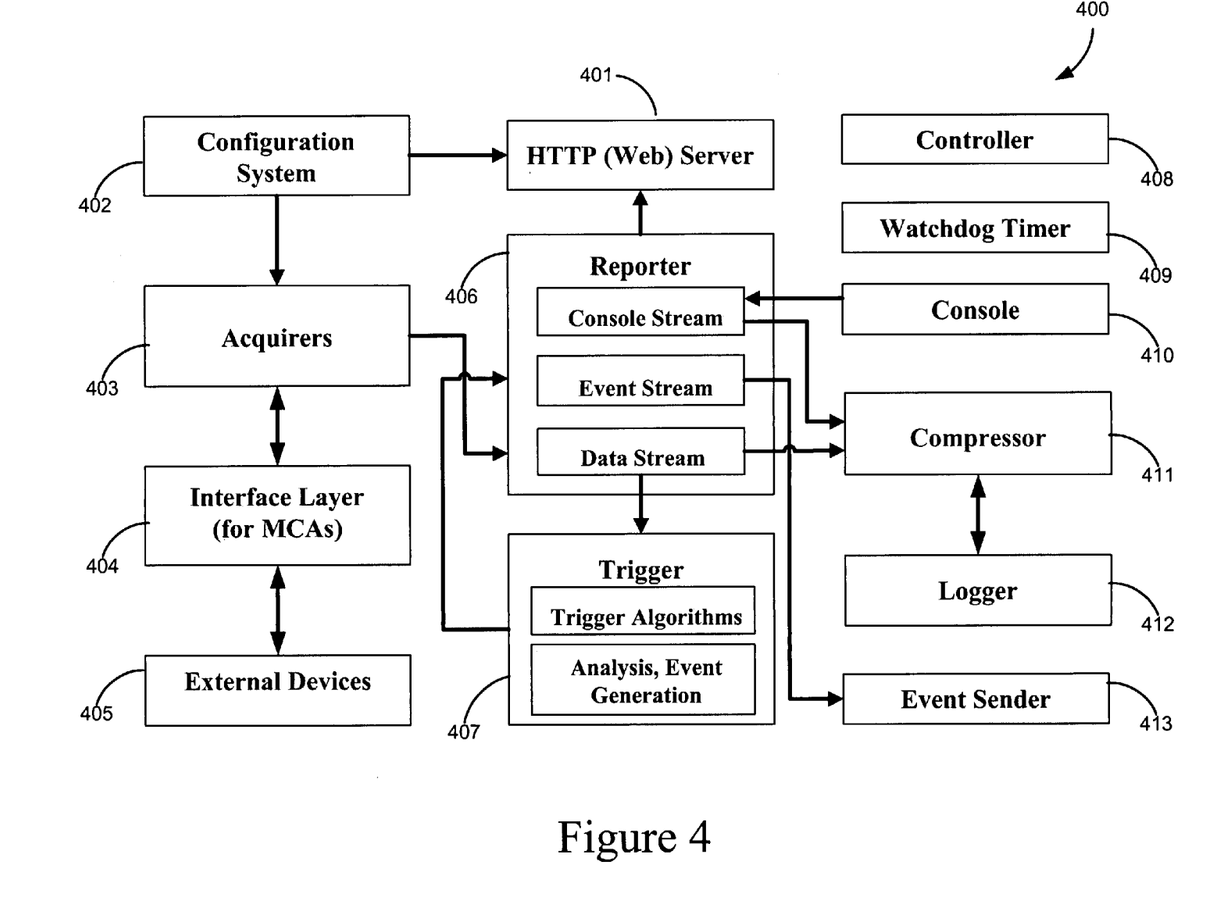
FIG. 4 is a flow chart showing the data flow of the radiation detection system.

FIG. 4 shows a chart outlining the general data flow in the operational method of the radiation detection system of the present invention, which is performed in the computer server. As shown, a configuration system 402 sets properties on most tasks performed by the server, and communicates with a HTTP (Web) server 401. Acquirers 403 communicate with an interface layer 404 which is necessary to communicate with MCA external devices among other external devices including NucSafe type detectors, and TTL output detectors such as He-3 neutron detectors and plastic detectors. A reporter module 406 provides the reporting of (1) a console stream generated by a console 410 which prints log information for an operation and accepts keystroke commands; (2) a data stream obtained from the acquirer module 403 which is compressed by data compressor 411 and logged by logger module 412; and (3) an event stream module which receives trigger event determinations from a trigger module 407 which uses trigger algorithms to analyze and determine the occurrence of trigger events. Upon the determination of a trigger event, the event sender 413 can optionally forward the event data to a remote monitoring station. Also shown in FIG. 4 is a controller 408 which handles command and control for all tasks, as well as a Watchdog Timer module 409 which talks to computer's I/O microcontroller. The software is designed as a modular multi-threaded process for robustness and quasi real-time processing. A platform independent client module written in, for example, Java may be utilized for easy remote control access and data display.

Figure 5:
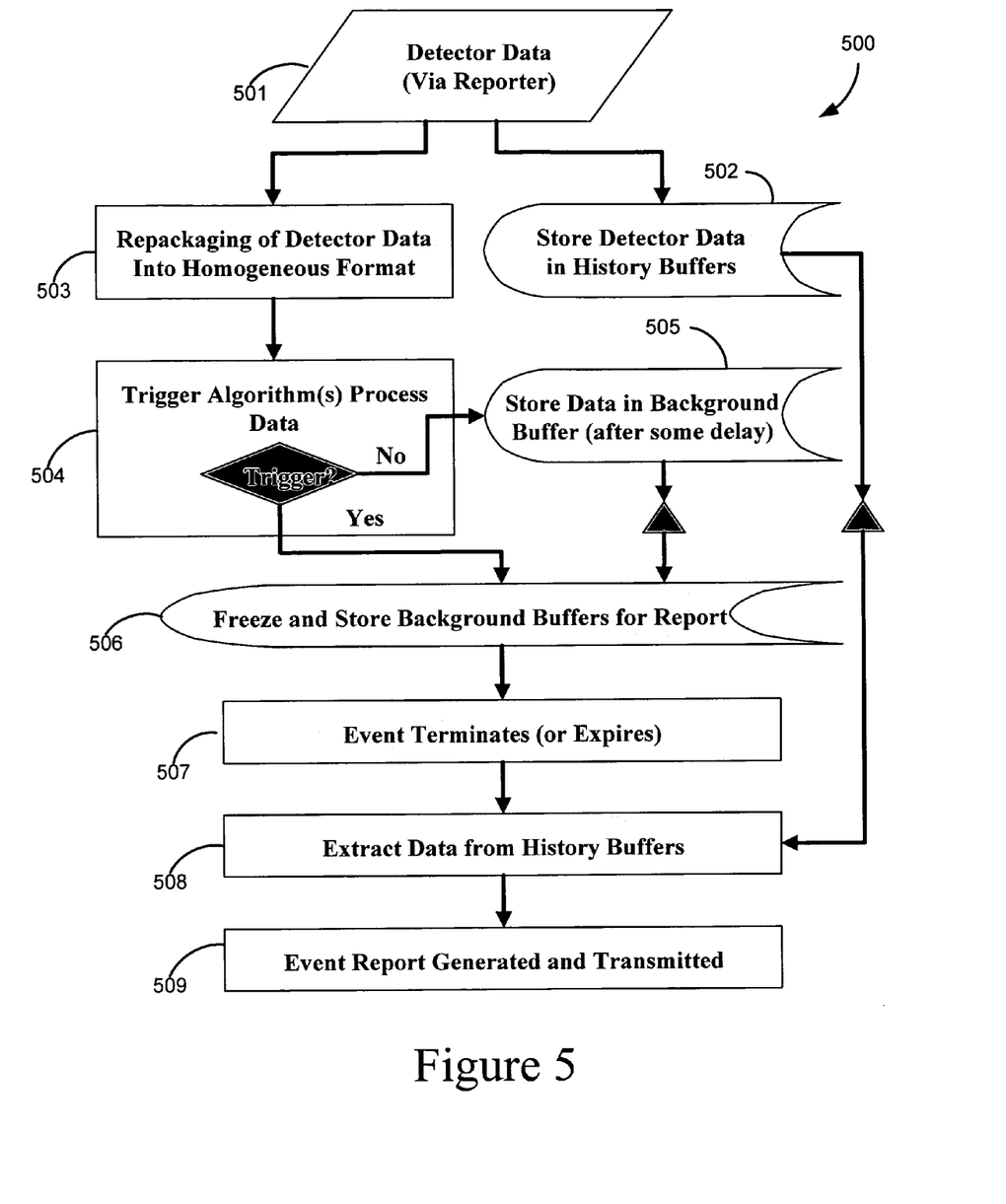
FIG. 5 is a flow chart showing the data flow from a triggering event.

The radiation detection system implements its trigger algorithm based on a time sliced spectral acquisition of less than about 150 msec time bins. It uses various statistical detector properties for background estimation and reliable event detection. In an exemplary embodiment, a particular triggering method for event detection is utilized which is based on the Sequential Probability Ratio Test (SPRT), a mathematical technique to determine whether a set of observations are consistent with a specified model within a given bound of statistical significance, e.g. n(sigma). FIG. 5 shows an exemplary data flow chart for a trigger event, beginning at 501 where detector data is received via the reporter (406 in FIG. 4). At 503 the detector data is repackaged into a homogeneous format and forwarded to the trigger algorithm determination module 504 where a determination is made using, for example, the SPRT algorithm discussed above. If no trigger is detected, data is stored in a background buffer at 505 after some delay. Simultaneous to step 503 of repackaging detector data, the same detector data is stored in history buffers at 502. At 506 background buffers are frozen and stored for report if a trigger is determined, and the event terminates or expires at 507. Next at 508 data from history buffers is extracted, and at 509, an event report is generated and transmitted.

The core operational software for the radiation detection system may be written to run on, for example, any IBM compatible computer, and in particular on Windows 2000, Windows XP and embedded Windows XP operating systems, as well as Linux using associated driver software, but is not limited only to such. And the client module is configured to run on any platform/operating system implementing a Java virtual machine. The code may be written using programming languages, such as for example, C, C++, and Java. The operational software may be written as batch software that automatically runs at Boot-up and detects the various detectors attached to the system. A configuration file is available for custom parameter settings. A subset of parameters can be set during run-time and status retrieved through HTTP requests and XML syntax. The software also supports various environmental devices such as temperature probe and humidity sensor. And the client module can run and remotely access the core software from any platform through the network. The software uses various DLL's and drivers from third party vendors. These may include, for example, the Canon SDK, the Target Systemelectronic Gmbh microbase access software and the Measurement Computing Universal Library "Instacal". The Isotope identification may utilize, for example, CALANA software developed by Sandia Laboratory.

Computer hardware utilized for data processing for may include, for example, a Pentium II or better IBM compatible computer with a minimum of 256 Mbytes of RAM and an Ethernet controller preferred. Special additional controllers may be required depending on the type of detectors controlled. For example, a USB1.1 or better controller is required for digital camera (e.g. Canon digital Camera) support and MCA (e.g. Microbase MCA available from Target, or digiBase MCA available from Ortec) support; a PC104 controller with a PC104-CTR10HD TTL counter board for He$_3$ tube support; RS232 serial controllers for environmental detectors supports and detectors available from NucSafe LLC; and sufficient (depending on execution time length) hard drive storage space for automatic data logging. The client module code requires a hardware supporting an operating system with a Java virtual machine. Additionally various camera solutions have been developed and used based on wired/wireless Ethernet based camera.

Figure 6:
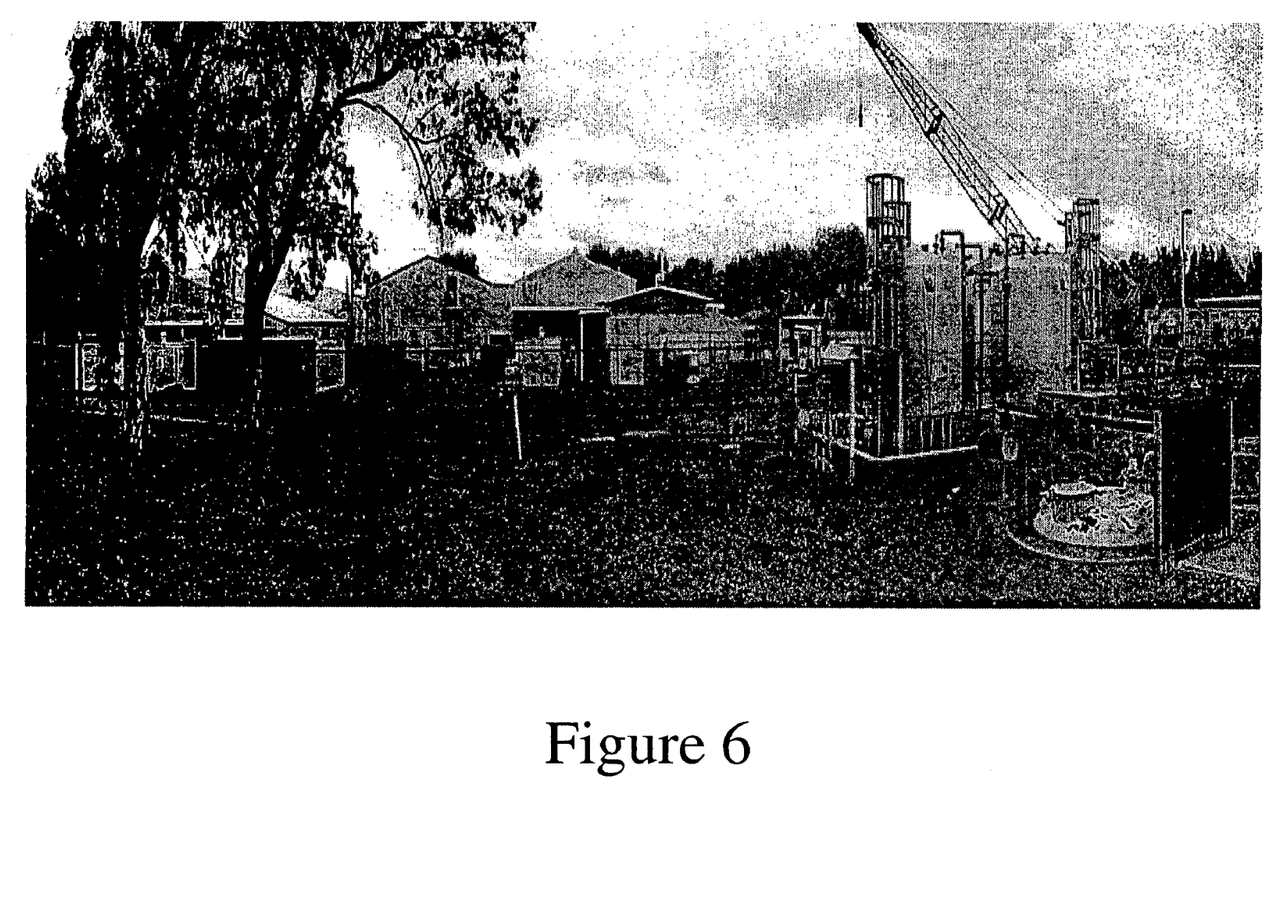
FIG. 6 is a photograph of a detection location where the detection data of FIGS. 7 and 8 were obtained.
Figure 7:
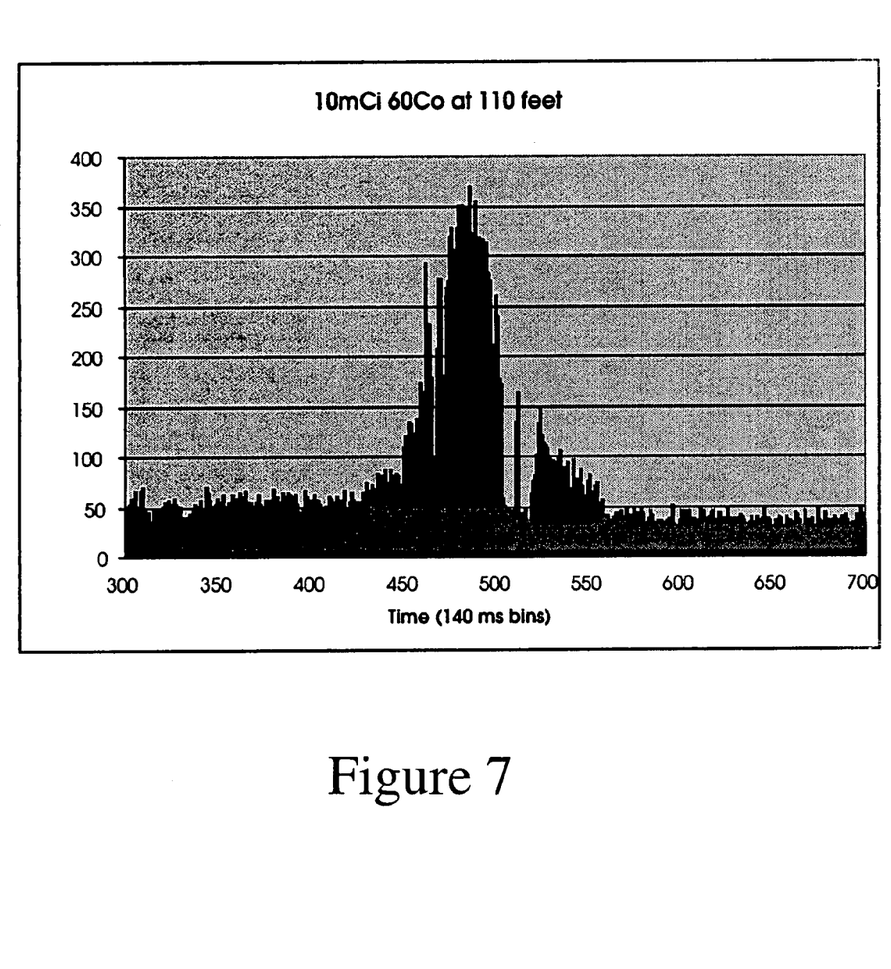
FIG. 7 is a graph of detection data obtained by the radiation detection system of the present invention using 140 msec time slices.
Figure 8:
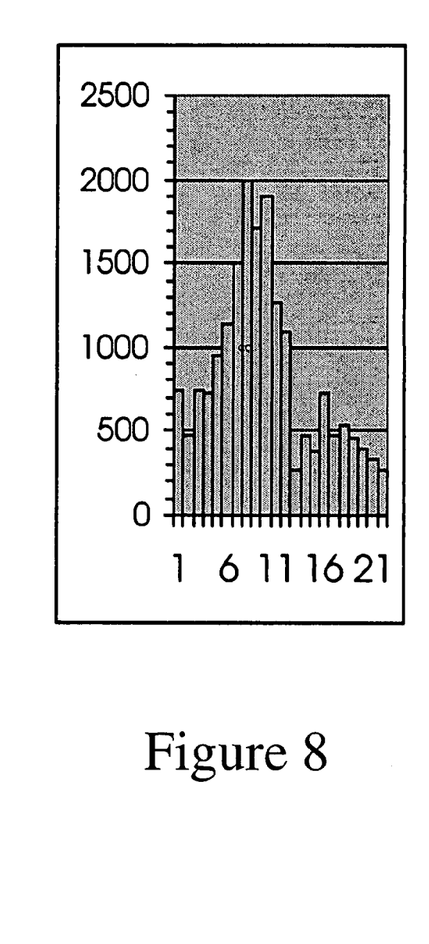
FIG. 8 is a graph of the detection data of FIG. 7 rebinned into 1 second time bins.

FIGS. 6–8 show an illustrative performance comparison between the small time bins of the present invention, and the 1 second time bins known in the art. FIG. 6 is a photograph of the setup location, showing a road behind the chain link fence where vehicles travel. On the right in the field of view are two water tanks, and on the left are two trees. In the middle is a clear field of view. Data from measurements taken are shown in FIG. 7 having small 140 msec time binned data. As can be seen in FIG. 7 with the 140 msec time bins, the dip at about 475 is from the two trees being between the source and detector. At time bin about 520, the two dips are from the water tanks being between the source and the detector, with the asymmetric shape at time bin about 550 being from the source driver slowing his vehicle to turn around. In contrast, the data plot of FIG. 8 shows the data of FIG. 7 rebinned to 1 second time bins, and showing the loss in detail by the washed out structure of the 1 second time bins.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

We claim:

1. A portable radioactive-material detection system comprising:
at least one non-HPGe radiation detector capable of detecting gamma-radiation and coupled to a multi-channel analyzer capable of collecting spectral data in small time bins of less than about 150 msec, whereby radioactive sources moving at high speeds may be detected;
a computer processor operably connected to the multi-channel analyzer and having a first processing module for determining triggering events from the spectral data;
data storage means operably connected to the computer processor for storing said spectral data;
a power source supplying power to the detection system; and
configurable means for radiation shielding the radiation detector to limit radiation detection to a monitoring area, wherein the computer processor has a second processing module for determining the direction of the moving radioactive source based on the relative spatial arrangement between the radiation shielding means and the radiation detector.

2. The portable radioactive-material detection system of claim 1,
wherein the multi-channel analyzer is a list-mode multi-channel analyzer.

3. The portable radioactive-material detection system of claim 1,
wherein the multi-channel analyzer is capable of collecting greater than about 10 channels of spectral data in small time bins of less than about 150 msec.

4. The portable radioactive-material detection system of claim 1,
wherein the computer processor has a third processing module for performing radioactive source identification from the spectral data associated with a triggering event.

5. The portable radioactive-material detection system of claim 1,
wherein the computer processor has a fourth processing module for communicating spectral data and triggering events to a remote data reporting system.

6. The portable radioactive-material detection system of claim 1,
further comprising a unit housing in which said radiation detector(s), computer processor, data storage means, and power source are mounted.

7. The portable radioactive-material detection system of claim 1,
wherein said radiation detector(s), computer processor, and power source are independent modular components.

8. The portable radioactive-material detection system of claim 1,
wherein the radiation detector(s) is chosen from the group consisting of a NaI, He-3, and scintillator detectors.

9. The portable radioactive-material detection system of claim 1,
wherein the configurable means for radiation shielding is a configurable tungsten shield.

10. The portable radioactive-material detection system of claim 1,
further comprising at least one onboard camera operably connected to the computer processor wherein the computer processor controls the camera(s) to shutter upon determination of a triggering event.

11. The portable radioactive-material detection system of claim 1,
wherein the computer processor includes means for interfacing with at least one more radiation-material detection system in a networked system.

12. The portable radioactive-material detection system of claim 11,
   wherein the means for interfacing is adapted to translate data received from the other interfaced detection system(s).

13. The portable radioactive-material detection system of claim 1,
   wherein the computer processor includes means for interfacing with an auxiliary device.

14. The portable radioactive-material detection system of claim 13,
   wherein the auxiliary device is a second computer providing a user interface for an operator to view the spectral data.

15. The portable radioactive-material detection system of claim 14,
   wherein the computer processor is adapted to transmit a notification signal to the second computer upon a triggering event.

16. The portable radioactive-material detection system of claim 13,
   wherein the auxiliary device is a camera and the computer processor is adapted to shutter the camera upon a triggering event.

17. A method of monitoring an area for moving radioactive materials comprising the steps of:
   providing a portable radiation detector coupled to a multi-channel analyzer and having configurable radiation shielding which limits radiation detection to the monitoring area;
   using the portable radiation detector and the multi-channel analyzer to collect spectral data in very small time bins of less than about 150 msec to enable detection of radioactive sources moving at high speeds;
   analyzing the spectral data to determine triggering events from the spectral data;
   upon a determination of a triggering event, determining the direction of the moving radioactive source based on the spectral data and the relative spatial arrangement between the radiation shielding and the radiation detector, and transmitting the spectral data associated with the triggering event to a central data reporting system.

18. A method in a computer system for monitoring an area for moving radioactive sources, said method comprising the computer-implemented steps of:
   controlling a multi-channel analyzer coupled to a radiation detector to collect spectral data in very small time bins of less than about 150 msec. for detecting radioactive sources moving at high speeds with detection windows of less than about 1 second, said radiation detector having configurable radiation shielding which limits radiation detection to the monitoring area;
   controlling a first computer processor module to determine the occurrence of triggering events from the spectral data;
   controlling a second computer processor module to determine the direction of the moving radioactive source based on the spectral data and the relative spatial arrangement between the radiation shielding and the radiation detector; and
   controlling a data storage device operably connected to the first computer processor to store the spectral data and any triggering events for post-collection analysis.

19. The computer-implemented method of claim 18,
   further comprising controlling a multimedia device to record the triggering event.

20. The computer-implemented method of claim 19,
   wherein the multimedia device is a camera.

21. The computer-implemented method of claim 18,
   further comprising controlling a third computer processor module to determine the source identification from spectral data associated with a triggering event.

22. The computer-implemented method of claim 18,
   further comprising remote controlling the method steps from a remote network location.

23. The computer-implemented method of claim 18,
   wherein the multi-channel analyzer is capable of collecting greater than about 10 channels of spectral data in small time bins of less than about 150 msec.

24. The computer-implemented method of claim 18,
   further comprising receiving detection data from at least one other radiation-material detection system interfaced to the computer system.

25. The computer-implemented method of claim 18,
   further comprising translating the detection data received from the other interfaced detection system(s).

26. An article of manufacture comprising:
   a computer usable medium having computer-readable program code means embodied therein for causing a gamma-radiation detection system to monitor for gamma-radiation sources moving at high speeds, said radiation detector having configurable radiation shielding which limits radiation detection to the monitoring area, the computer-readable program code means in said article of manufticture comprising:
   computer-readable program code means for causing the control of a multi-channel analyzer coupled to a radiation detector to collect spectral data in very small time bins of less than about 150 msec. for detecting radioactive sources moving at high speeds;
   computer-readable program code means for causing the control of a first computer processor module to determine the occurrence of triggering events from the spectral data;
   computer-readable program code means for causing the control of a second computer processor module to determine the direction of the moving radioactive source based on the spectral data and the relative spatial arrangement between the radiation shielding and the radiation detector; and
   computer-readable program code means for causing the control of a data storage device operably connected to the first computer processor to store the spectral data and triggering events for post-collection analysis.

27. The article of manufacture of claim 26,
   further comprising computer-readable program code means for causing the control of a multimedia device to record the triggering event.

28. The article of manufacture of claim 27
   wherein the multimedia device is a camera.

29. The article of manufacture of claim 26,
   further comprising computer-readable program code means for causing the control of a third computer processor module to determine the source identification of spectral data associated with a triggering event.

30. The article of manufacture of claim 26,
   further comprising computer-readable program code means for causing the control of a fourth computer processor module to determine from the spectral data and the directional placement of a radiation shielding which direction the radioactive source was moving.

* * * * *